United States Patent [19]

Thomas

[11] 4,313,456
[45] Feb. 2, 1982

[54] UNIVERSAL CHECK VALVE ASSEMBLY

[76] Inventor: Mark W. Thomas, 472 Lotus La., Mt. View, Calif. 94043

[21] Appl. No.: 219,595

[22] Filed: Dec. 24, 1980

[51] Int. Cl.³ .............................................. F16K 15/14
[52] U.S. Cl. ................................ 137/269; 137/454.2; 137/512.15
[58] Field of Search ................. 137/512.1, 512.15, 527, 137/527.2, 527.4, 527.6, 527.8, 269, 271, 454.2

[56]  References Cited

U.S. PATENT DOCUMENTS

| | | | |
|---|---|---|---|
| 3,208,472 | 9/1965 | Scaramucci | 137/512.15 X |
| 3,831,628 | 8/1974 | Kintnel | 137/512.15 |
| 4,039,004 | 8/1977 | Luthy | 137/527 |
| 4,094,336 | 6/1978 | Urschel | 137/512.1 |
| 4,146,048 | 3/1979 | McCabe | 137/512.1 X |

Primary Examiner—William R. Cline
Attorney, Agent, or Firm—Paul L. Hickman

[57] ABSTRACT

A universal check valve assembly is disclosed which fits within an exhaust conduit having any one of a range of diameters and without any modification to the structure of the conduit. The assembly includes an adjustable diameter support hoop and a circular, single piece valve structure of variable diameter which can removably engage the support hoop. The support hoop has a downwardly extending, outwardly flaring skirt portion which resiliently engages the inner wall of an exhaust conduit.

9 Claims, 8 Drawing Figures

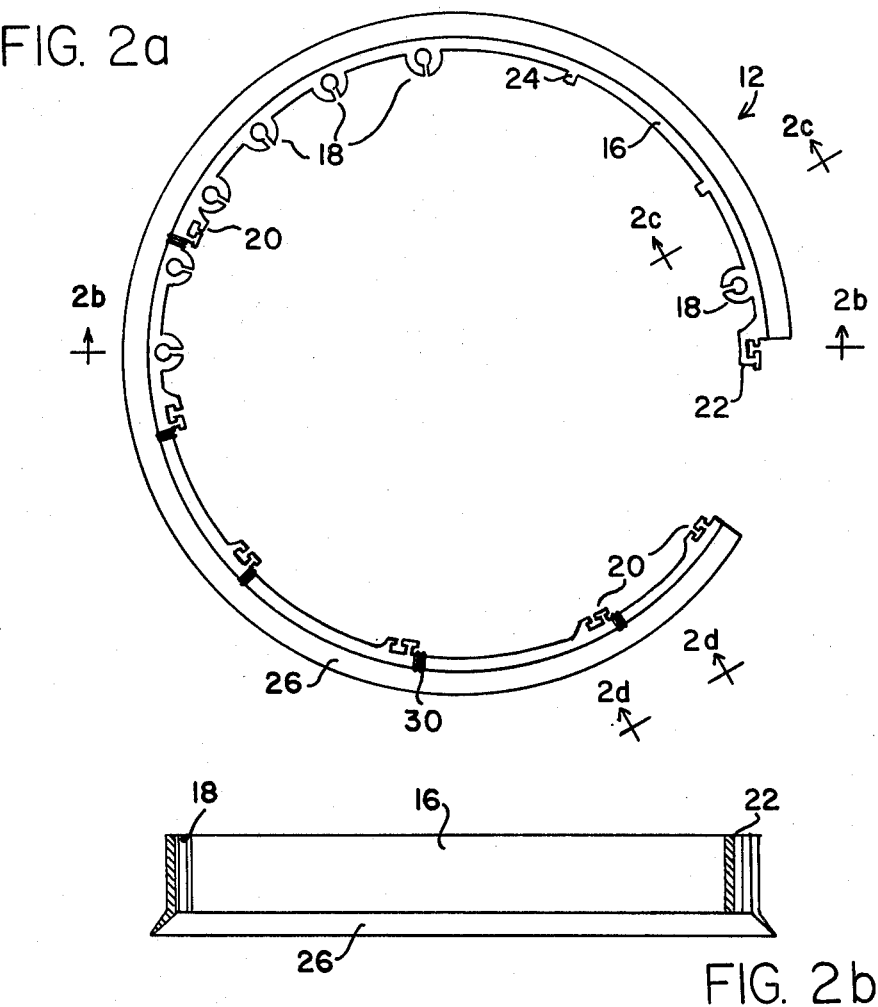
FIG. 2a
FIG. 2b
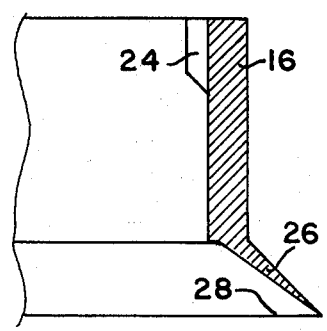
FIG. 2c
FIG. 2d

UNIVERSAL CHECK VALVE ASSEMBLY

BACKGROUND OF THE INVENTION

1. Field of the Invention

This invention relates generally to valves and more particularly to check valve assemblies which allow fluid to flow only in one direction within a conduit.

2. Description of the Prior Art

Houses and other structures are provided with chimneys, flues and other exhaust conduits to allow fumes from furnaces, stoves and the like to escape into the ambient environment. As one example, most stoves have a hood suspended above their burners for collecting cooking fumes and smoke, and an exhaust conduit which extends from the hood to the outside of the home. When the burners are being used heated air, smoke and particulate matter are drawn up the conduit, usually with the aid of an electrically powered fan, and safely vented outside.

A problem occurs when the burners are not being used and the fan is turned off. In this situation, cool air can rush down the conduit and into the home environment and warm air can slowly leak out. Thus a great deal of energy is wasted trying to maintain a house at a constant temperature due to a continuous influx of cool air from outside the house. This energy wastage could be eliminated by providing the venting conduit with a check valve which would allow exhaust fumes to escape but which would prevent cool air from flowing down the conduit from the outside.

The prior art is rich with examples of check valves used for similar applications. Most of the prior art check valves are of the "butterfly" type and are provided with some means for biasing the valve towards its closed position. Three examples of prior art check valve assemblies are described in U.S. Pat. Nos. 3,941,151 of J. Biddle; 1,301,455 of O. Kiessig; and 859,139 of I. Spencer. Each of the described assemblies includes a butterfly type valve disposed within a cylindrical sleeve which can be attached over or within an end of a conduit or pipe. A disadvantage with this type of assembly is that, for it to be used, an end of a conduit or pipe has to be easily accessible and free of obstructions.

Other types of check valve assemblies, such as the one described in U.S. Pat. No. 1,743,731 of W. Scott are designed to be disposed within a continuous length of conduit. Usually, however, such devices are ill adapted to be retrofitted into existing conduits and thus are mostly limited to new installations.

A problem that the prior art apparently has not addressed is how to safely and easily retrofit a check valve assembly within an existing conduit structure without modifying the structure in any way. All known prior art assemblies that are retrofittable within a conduit need to be anchored therein by forming one or more holes through the walls of the conduit and extending an anchoring pin therethrough. While U.S. Pat. No. 4,039,004 or R. Luthy describes the use of a resilient elastomer for attaching a backflow valve to a pipe fitting, Luthy's device cannot be retrofited within a conduit proper.

Another problem not solved in the prior art is how to construct a universal check valve assembly which can be adjusted to fit within differently sized conduits. All known prior art check valves have a fixed diameter and thus can only be used with a conduit having that same diameter.

The following U.S. Pat. Nos. are felt to be related to the present invention, although in no way anticipatory thereof: 3,951,051; 3,589,268; 3,584,566; 3,311,302; 3,285,155; 3,187,768; 2,825,275; 2,568,355; 2,599,075; 1,628,644; 1,503,915; and 756,046.

SUMMARY OF THE INVENTION

It is an object of this invention to provide a universal check valve assembly that can be safely and easily retrofitted within an existing conduit without modifying the structure of the conduit in any way.

It is another object of this invention to provide a universal check valve assembly which can be adjusted to fit within a number of standard diameter conduits.

It is a still further object of this invention to accomplish the above mentioned objects with a device that is easy and inexpensive to manufacture and which is rugged, longlasting and dependable in use.

Briefly, the invention includes an ajustable diameter support hoop and a single piece valve structure engagable with the support hoop. The support hoop can take the form of an elongated strip and is provided with a number of sockets and a number of interlocks along its inner surface. The strip can be trimmed to different lengths and its ends interlocked together to produce a hoop of various diameters. Downwardly extending from the hoop is a skirt portion designed to resiliently engage the inner wall of an exhaust conduit.

The valve structure is substantially circular and includes a diametrical spine and a pair of valve flaps attached on either side of the spine. Downwardly extending from the spine are a number of cylindrical projections which can engage with diametrically opposed sockets of the support hoop. The upper surface of the valve flaps are provided with a number of concentrically formed score lines where the valve flaps can be trimmed to vary the diameter of the valve structure.

An advantage of this invention is that the support hoop supports the valve within an exhaust conduit without modifying the structure of the conduit in any way.

Another advantage of this invention is that both the support hoop and the valve structure have variable diameters so that the present device can be used with exhaust conduits having a number of different diameters.

Yet another advantage of this invention is that the device is producable by injection molding and thus can be inexpensive to produce.

These and other objects and advantages of the present invention will no doubt become apparent upon a reading of the following descriptions and a study of the several figures of the drawing.

BRIEF DESCRIPTION OF THE DRAWING

FIG. 2a is a top plan view of member 12 of FIG. 1.

FIG. 2b is a cross sectional view taken along line 2b—2b of FIG. 2a.

FIG. 2c is a cross sectional view taken along line 2c—2c of FIG. 2a.

FIG. 2d is an elevational view taken along line 2d—2d of FIG. 2a.

FIG. 3b is an elevational view taken along line 3b—3b of FIG. 3a.

FIG. 3c is a cross sectional view taken along line 3c—3c of FIG. 3a.

DESCRIPTION OF THE PREFERRED EMBODIMENT(S)

Figure 1:
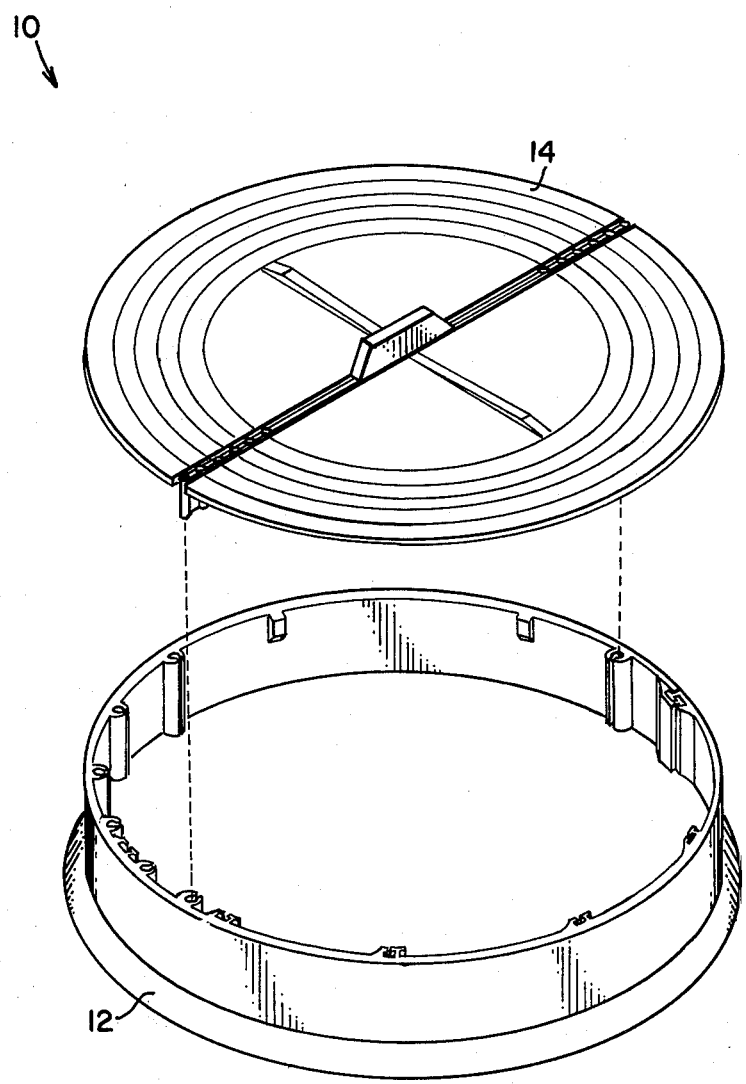
FIG. 1 is a perspective view of a universal check valve assembly in accordance with the present invention.

Referring to the perspective view of FIG. 1, a universal check valve assembly 10 in accordance with the present invention includes a support hoop 12 and a circular, single piece valve structure 14. As indicated by broken lines, the projections downwardly extending from the valve structure engage sockets of the support hoop to removably attach the valve structure and the support hoop together.

Referring now to FIGS. 2a—2d, the support hoop can be discussed in greater detail. The support hoop is formed from an elongated strip 16 of polypropylene which is provided with a number of hollow, cylindrical sockets 18 formed transversely (with respect to its length) along its inner surface. Also formed transversly along the inner surface of strip 16 are a number of interlocks 20 having a first configuration, and one interlock 22 having a second configuration which can matingly engage with any one of interlocks 20. Two support projections 24 are also provided on the inner surface of the strip.

As can be seen, downwardly extending from the strip 16 is a skirt portion 26. The skirt flares outwardly from the strip and tapers down to its hemline 28, as best seen in FIG. 2c. It is this resilient, outwardly flaring skirt portion which couples and seals the present invention within an exhaust conduit.

A score line is located just counter-clockwise of each of interlocks 20, as seen in FIGS. 2a and 2d. In FIG. 2d it can be seen that the score line is preferably flanked by two small ridges 32.

Figure 3A:
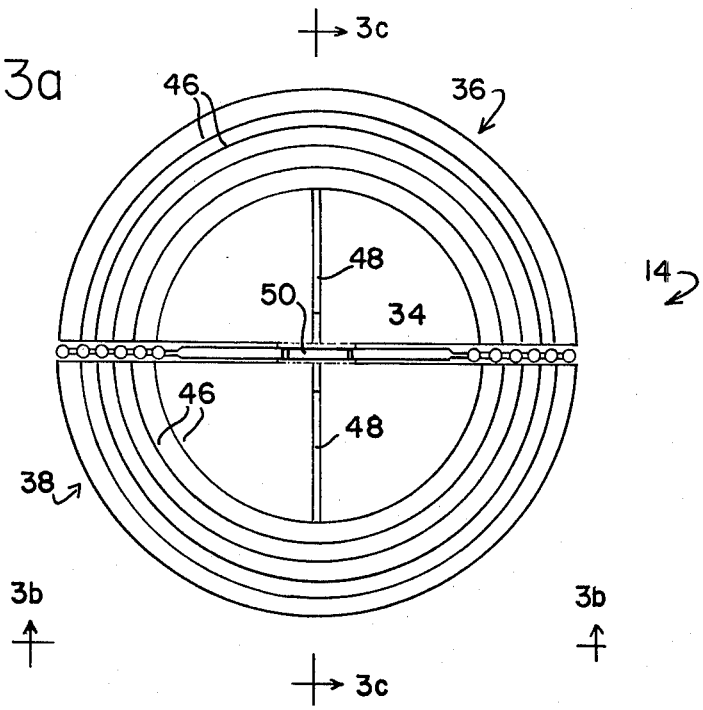
Figure 3B:
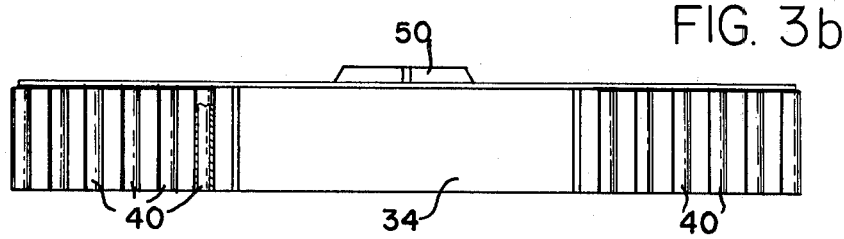
FIG. 3b is a top plan view of member 14 of FIG. 1.
Figure 3C:
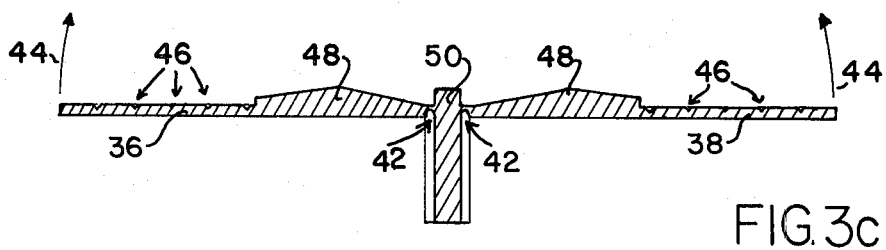

In FIGS. 3a—3c the valve structure is shown in greater detail. Valve 14 is a single piece, substantially circular structure having a diametrical spine 34 which supports a first semi-circular valve flap 36 and a second semi-circular valve flap 38. The valve flaps are flexible and relatively thin.

As best seen in FIGS. 3b and 3c the spine extends below the valve flaps and is provided with a number of cylindrical projections 40 which, as indicated earlier, can fit within the hollow, cylindrical sockets of the support hoop. In FIG. 3c it can be seen that the material of the valve structure which connects the valve flaps to the spine thins at 42 to form a "live hinge". This hinged attachment between the flaps and the spine allow the valve to swing upwardly as suggested by arrows 44.

The upper surfaces of the valve flaps are provided with a number of concentric score lines 46 preferably formed about ½ inch apart. A pair of ribs 48 rise above the upper surface of the valve flaps to stiffen and support the flaps. A handle 50 rises from the upper surface of the spine.

To prepare the present device for use the diameter of the conduit into which assembly is to be fitted is measured. The diameter of the support hoop 12 is then adjusted to fit the conduit. If the conduit is ten inches in diameter the hoop will have the correct diameter if interlock 22 is mated with the interlock 20 at the other end of the strip. By trimming off the strip at one of the score lines 30 and mating interlock 22 with interlock 20 then at the end of the strip the support hoop can be adjusted to also fit within conduits having diameters of nine, eight, seven, six and five inches.

Next, the diameter of the valve structure is adjusted to fit within the support hoop. For a ten inch diameter conduit no modification of the valve structure is necessary. But cutting the valve flaps along one of the concentric score lines with a pair of scissors or shears the valve structure can be adjusted to fit within the support hoop for nine, eight, seven, six and five inch conduits.

It will be noted that the cylindrical projections 40 are tangently normal to the score lines on the valve flap. Adjusting the diameter of the valve structure by removing unwanted material along the score line removes the projections which fall outside of the score line's diameter.

In use, the outermost pair of cylindrical projections are coupled with a diametricaly opposed pair of cylindrical sockets of the support hoop. It will be noted that only two of the cylindrical sockets will oppose for chosen conduit diameter. The assembled check valve is then press fitted into an exhaust conduit. The skirt of the support hoop seals against the inner wall of the conduit and resiliently holds the check valve assembly in place.

It was mentioned earlier that polypropylene is a preferred material of construction for this device. However, other materials such as metal, fiberboard, and other plastics are also suitable.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. A universal check valve adapted for retrofit within a tubular conduit comprising:
    an adjustable diameter support hoop formed from an elongated strip provided with a plurality of sockets formed along an inner surface thereof, said strip further being provided with a plurality of a firstly configured interlocks formed along said inner surface, said strip further being provided with a secondly configured interlock formed along said inner surface, said secondly configured interlock being removably engagable with said firstly configured interlocks, said elongated strip being further provided with a downwardly extending, outwardly flaring skirt;
    a circular valve structure of adjustable diameter including a diametrical spine, a first semi-circular valve flap hingedly attached to one side of said spine, a second semi-circular flap hingedly attached to an opposing side of said spine, said valve structure being provided with at least one concentrically formed score line on an upper surface of said valve flaps, said valve further being provided with a plurality of projections downwardly extending from said spine, said projections being engagable with a diametrically opposed pair of said sockets.

2. A universal check valve as recited in claim 1 wherein said valve is provided with a plurality of concentrically formed score lines on an upper surface of said valve flaps, and wherein said plurality of projections includes projections downwardly extending from said spine and tangentially normal to said plurality of score lines.

3. A universal check valve as recited in claim 2 wherein said sockets are of an elongated, hollow, cylindrical configuration and wherein said projections are substantially cylindrical, whereby said cylindrical projections fit within said hollow, cylindrical sockets.

4. A universal check valve as recited in claim 3 wherein said sockets are provided with a radially facing longitudinal slot.

5. A universal check valve as recited in claim 4 wherein said hoop is provided with a transverse score line proximate to each of said plurality of firstly configured interlocks.

6. A universal check valve as recited in claim 5 wherein said skirt tapers down to its hemline.

7. A universal check valve as recited in claim 6 wherein said elongated strip is further provided with at least one flap valve supporting projection formed on said inner surface.

8. A universal check valve as recited in claim 7 wherein said valve structure is provided with a pair of reinforcement ribs extending radially along said upper surface of said flap valves.

9. A universal check valve as recited in claim 8 wherein said hinged attachments of said flap valves to said spine are live hinges created by a thinning of the material of the valve structure on either side of said spine.

* * * * *